Aug. 30, 1932.   R. W. BURNETT   1,874,438
METHOD OF AND MEANS FOR APPLYING HAND BRAKES TO RAILWAY CARS
Filed July 25, 1927   5 Sheets-Sheet 1
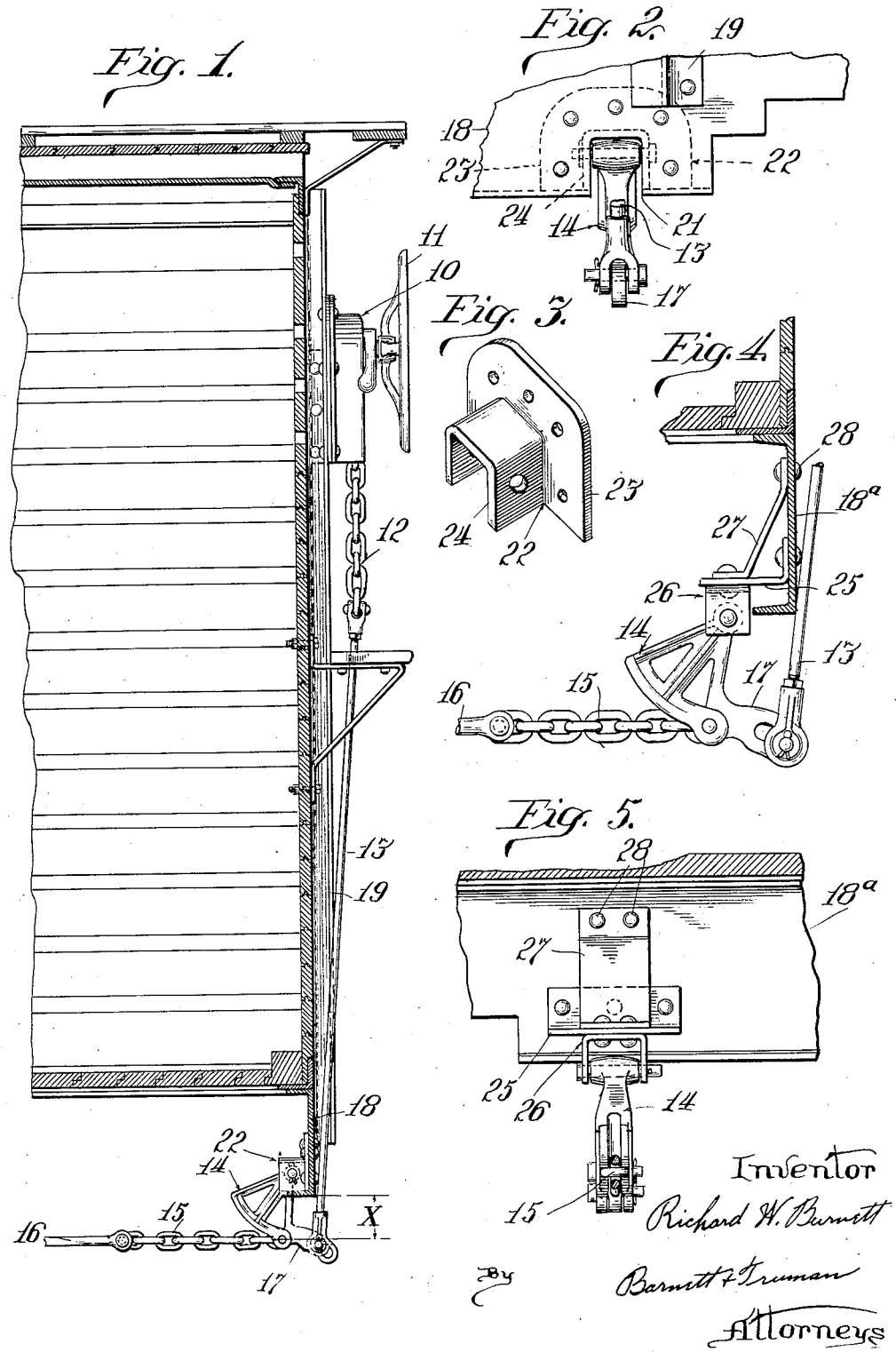

Aug. 30, 1932.  R. W. BURNETT  1,874,438

METHOD OF AND MEANS FOR APPLYING HAND BRAKES TO RAILWAY CARS

Filed July 25, 1927  5 Sheets-Sheet 2

Inventor
Richard W. Burnett
Barrett & Truman
Attorneys

Aug. 30, 1932.    R. W. BURNETT    1,874,438
METHOD OF AND MEANS FOR APPLYING HAND BRAKES TO RAILWAY CARS
Filed July 25, 1927    5 Sheets-Sheet 3
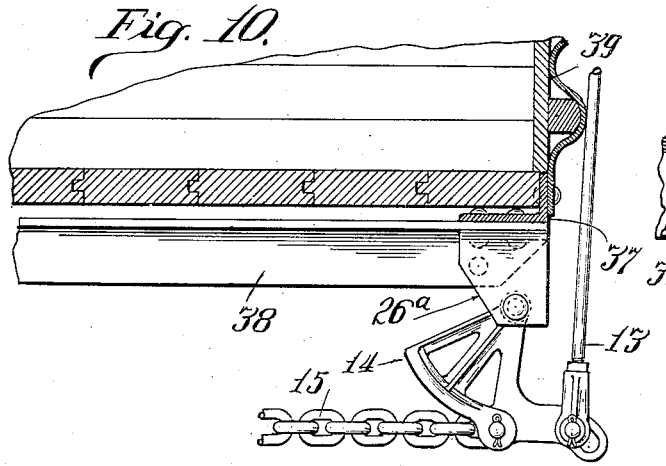
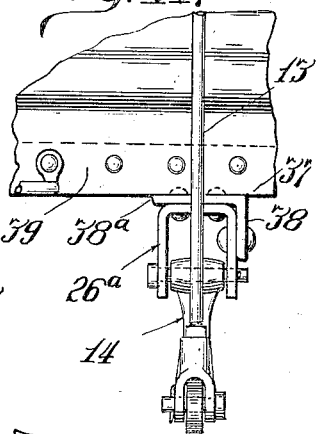
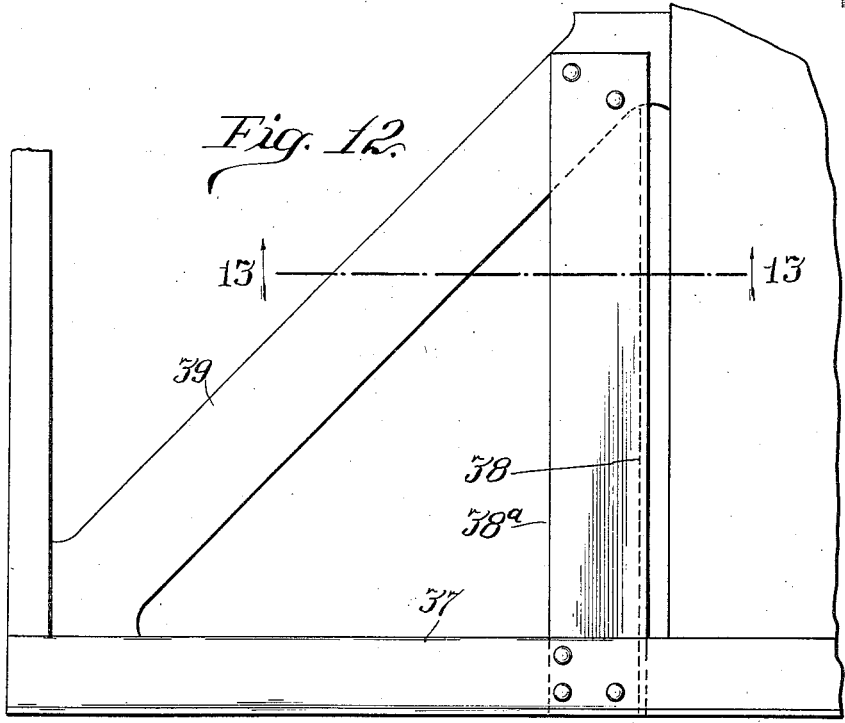
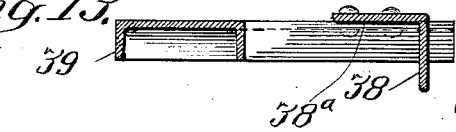

Aug. 30, 1932.    R. W. BURNETT    1,874,438
METHOD OF AND MEANS FOR APPLYING HAND BRAKES TO RAILWAY CARS
Filed July 25, 1927    5 Sheets-Sheet 4
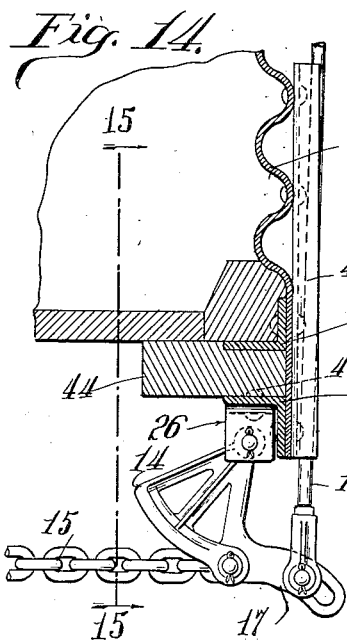
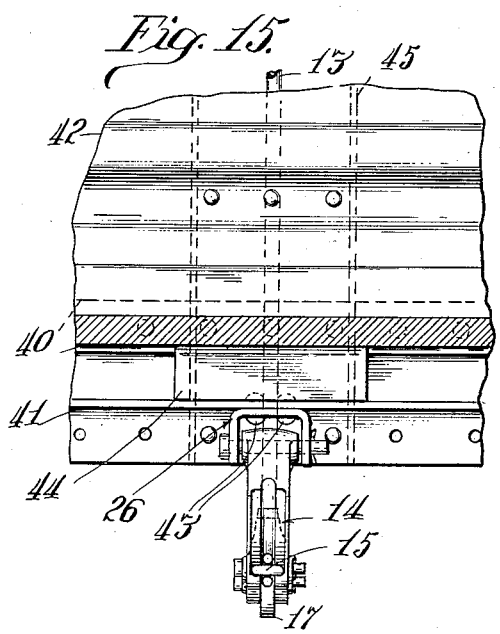
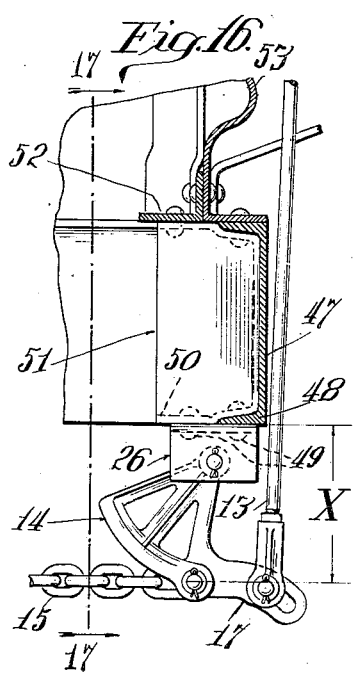
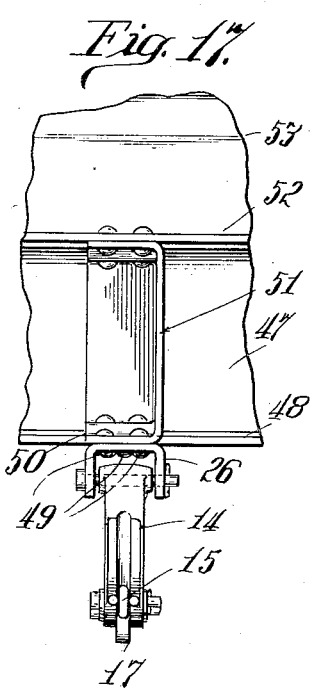
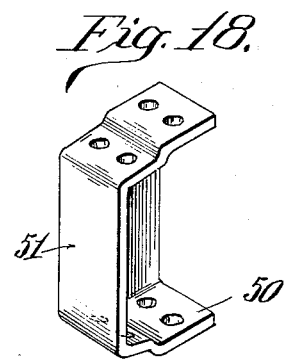
Inventor
Richard W. Burnett
By Barnett & Truman
Attorneys Aug. 30, 1932.  R. W. BURNETT  1,874,438
METHOD OF AND MEANS FOR APPLYING HAND BRAKES TO RAILWAY CARS
Filed July 25, 1927  5 Sheets-Sheet 5

Inventor
Richard W. Burnett
by Barnett & Truman
Attorneys

Patented Aug. 30, 1932

1,874,438

UNITED STATES PATENT OFFICE

RICHARD W. BURNETT, OF CHICAGO, ILLINOIS

METHOD OF AND MEANS FOR APPLYING HAND BRAKES TO RAILWAY CARS

Application filed July 25, 1927. Serial No. 208,283.

My invention relates to the method of and means for applying hand brakes to railway cars and particularly to improvements in the method of and means for applying to railway cars, hand brakes of a type comprising hand power mechanism, a power transmitting member secured to the lower portion of the car, and flexible connectors for connecting the power transmitting member with the winding mechanism and with the brake rigging beneath the car.

The principal objects of the invention are to so mount the hand brake mechanism on the car as to minimize friction, provide ample standing room for the trainman during the hand brake operation, maintain the required clearances between adjacent cars of various types, and to provide inexpensive reinforcements for the parts of the car which receive the stresses incident to the setting of the hand brake.

A more specific object of the invention is to provide inexpensive reinforcements of the above character which will facilitate the application of the type of hand brake herein shown to railway cars of various types and constructions and which, by preventing distortion of the car framing to which the power transmitting member of the hand brake is attached, will insure the proper operation of the hand brake mechanism.

The invention has for further objects the specific construction, arrangement and combination of the reinforcing members, and the associated parts of the car and the hand brake mechanism hereinafter described and claimed for carrying out the above stated objects and such other objects as will appear from the detailed description of the several embodiments of the invention shown in the accompanying drawings.

In the drawings:

Fig. 1 is a vertical section through the end wall and end sill of a railway box car showing the method of and means for applying to the car, hand brakes of the type above referred to and in which reinforcement of the car end sill is adapted to be used as a means of attaching a part of the hand brake to the said end sill.

Fig. 2 is a fragmentary view in elevation of the car end sill showing the arrangement of the reinforcing member.

Fig. 3 is a view in perspective of the reinforcing members shown in Figs. 1 and 2.

Figs. 4 and 5 are fragmentary sectional and rear face views, respectively, of the end sill of the car construction shown in Fig. 1 illustrating another method of applying the hand brake to the car together with a modified form of end sill reinforcement.

Figs. 10 and 11 are views similar to Figs. 6 and 7, but illustrating another method of applying the hand brake to a car having an angle bar end sill construction and showing a further modification of reinforcing means.

Fig. 12 is a plan view of the under-frame of the railway car showing the manner of attaching the reinforcing bar to the end sill and other parts of the car framing.

Fig. 13 is a cross sectional view taken on line 13—13 of Fig. 12, looking in the direction indicated by the arrow.

Figs. 14 and 15 are fragmentary sectional and rear face views, respectively, of a railway car showing the application of the hand brake mechanism shown in Fig. 1 to a railway car having an end sill construction of the type shown in said figures and illustrating a suitable reinforcement for said end sill construction.

Figs. 16 and 17 are views similar to Figs. 14 and 15, but illustrating a channel end sill construction and showing a reinforcing member for rigidifying the end sill and providing an attachment for the bell crank member of the hand brake mechanism.

Fig. 18 is a view in perspective of the reinforcing member shown in Figs. 16 and 17.

Figure 6:
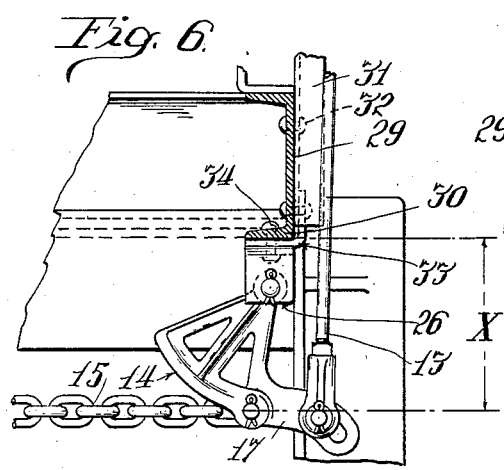
Figs. 6 and 7 are fragmentary sectional and front views, respectively, of a car having a channel end sill construction and illustrating a form of end sill reinforcement employed when the bell crank member of the hand brake, shown in Fig. 1, is attached to the lower flange of the end sill.

The several end sill reinforcing members herein shown facilitate, in various ways, the application of the particular type of hand brake shown to various types of railway cars.

The hand brake mechanism may be described briefly as consisting of a winding mechanism enclosed in a casing 10 and adapted to be operated by means of a hand wheel 11. The winding mechanism is connected by means of a flexible connector (preferably a chain 12 and a rod 13) with a power transmitting member 14. The member 14 is pivotally attached to the under-framing of the car, in many cases to the end sill, and is connected by means of a chain 15 to the pull rod 16 or other suitable operative member of the brake rigging underneath the car. The power transmitting member 14 is preferably in the form of a drum segment which, during the operation of the winding mechanism, is so rocked as to wind the chain 15 about the periphery of the segment and thereby move the brake shoes into engagement with the car wheels.

In hand brake mechanism of the above character, the winding mechanism and the power transmitting member are so proportioned that, after the slack in the connectors is taken up by the initial winding movement, the change in the angular position of the member 14 tending to increase the length of the power arm 17 thereof, is accompanied by a differential in the power developed by the winding mechanism so as to provide for a substantially uniform application of power. It is desirable, in maintaining efficient operation of the hand brake, to avoid the formation of excessive slack in the connectors, such, for example, as might result from the distortion of the car framing under the forces imposed thereon during the setting of the hand brake. It is also desirable to avoid such vertical or lateral movement of the pull rod 16 as would be likely to increase the friction by bringing the rod into rubbing engagement with parts of the car during the brake setting operation.

In Figs. 1 and 2, I have illustrated a car construction, in which the dimension X between the longitudinal center of the pull rod 16 and the lower edge of the end sill 18 is insufficient to permit the member 14 to be secured to the lower flange of the end sill without danger of so changing the vertical position of the pull rod as to move it into frictional engagement with parts of the car body or the truck.

In applying the general type of hand brake illustrated in Figs. 1 and 2 of the drawings, I preferably secure the casing of the winding mechanism to the Z-bar end posts 19, as shown in Fig. 1. The power transmitting member 14 is pivotally attached to the under frame of the car in such position relative to the longitudinal center of the brake rod that the chain 15 will wrap about the periphery of said member without affecting any substantial vertical movement of the pull rod.

In order to provide sufficient clearance between the end sills of the adjacent cars, the member 14 is secured, preferably, to the rear face of the end sill 18, the said sill being cut away at 21 to provide the clearance necessary to permit the power arm 17 of the member 14 to be raised by the winding mechanism. The means for attaching the member 14 to the end sill consists preferably of a combined bracket and rigidifying member 22. The member 22 is formed, preferably, with a flange 23, which surrounds the opening 21 in the end sill and is secured, by rivets or other suitable means of attachment, to the end sill. An inverted U-shaped flange 24 extends outwardly from the flange 23 and serves, in addition to providing a bracket for supporting the member 14, to reinforce the end sill 18 both vertically and transversely thereof.

In Figs. 4 and 5, I have illustrated the application of the brake mechanism construction similar to the construction shown in Fig. 1. In the constructions shown in Figs. 4 and 5 the member 14 is attached to the rear face of the end sill 18a by means of a bracket which supports the member 14 outwardly from the end sill 18a. In this installation, the member 14 is supported somewhat lower relative to the lower edge of the end sill than is shown in Fig. 1 and is thereby provided with ample clearance to permit the member 14 to be rocked upwardly during the brake setting operation. The supporting bracket consists preferably of an angle bar 25, one flange of which is riveted to the rear face of the end sill 18a. A U-shaped member 26, in which the member 14 is pivoted, is attached to the outer end of the angle bar 25. The angle bar 25 and the said end sill is reinforced by means of a compression brace 27, which extends diagonally from the outer end of the angle bar 25 to the end sill and is secured to the end sill near the upper end thereof by means of rivets 28. With this construction the stresses incident to the setting of the hand brake are distributed over the full width of the end sill.

Figure 7:
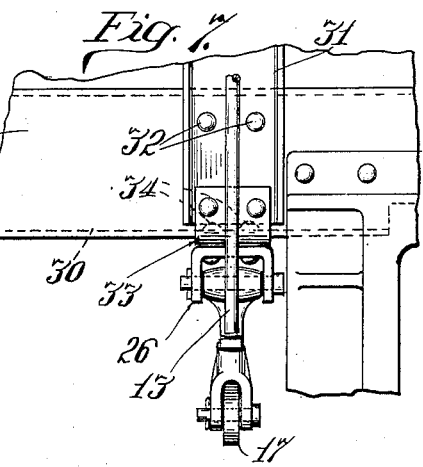

In Figs. 6 and 7 I have illustrated a hopper car construction in which the distance X between the lower end of the end sill 29 and the horizontal center of the brake pull rod and chain 15 is such as to permit the member 14 to be attached directly to the lower flange 30 of the end sill. In order to reinforce the end sill 29 I preferably secure a channel member 31 to the end sill by rivets 32 and secure the upper end of the channel member to the upper portion of the hopper. An angle bar 33 is secured to the lower end of the channel bar 31 and to the horizontal lower flange 30 of the end sill, so as to reinforce the lower flange of said end sill. The attaching bracket 26 of the rocking member 14 is secured directly to the lower flange 30 of the end sill and the angle 33 by means of rivets 34.

Figure 8:
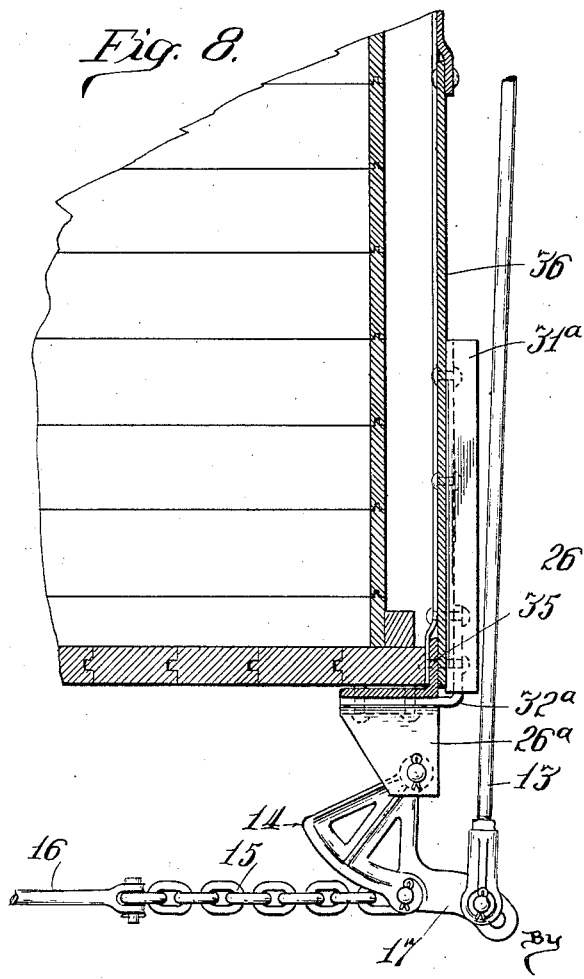
Fig. 8 is a sectional view illustrating a reinforcement of the character shown in Figs. 6 and 7, but showing said reinforcements in connection with a railway car having an angle end sill construction.
Figure 9:
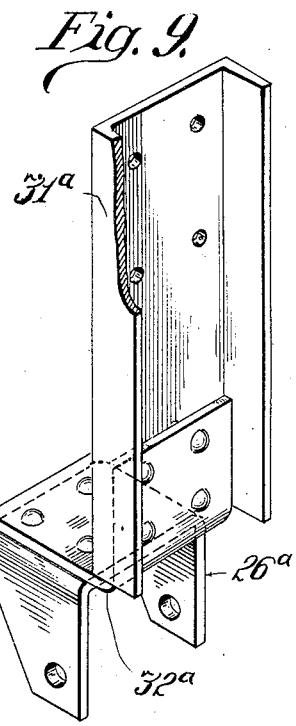
Fig. 9 is a view in perspective of the reinforcing members shown in Fig. 8.

In Figs. 8 and 9 I have shown a similar installation applied to a railway car in which the end sill consists of an angle bar 35 secured to the lower end of the sheet metal end wall 36 of the car. The vertically extending channel 31a, in these figures, extend only partway up the end wall, as shown in Fig. 8. The angle 32a is secured to the lower end of the channel 31a and to the horizontal flange of the angle 35, in substantially the same manner as that described in connection with the construction shown in Figs. 6 and 7. In this embodiment the U-shaped attaching bracket 26a is somewhat wider than the bracket 26 shown in the preceding figures, and is also somewhat longer than the bracket 26, so as to provide for the distance between the end sill and the horizontal center line of the chain 15 and the pull rod 16.

In Figs. 10 to 13 inclusive, I have illustrated a car end sill construction somewhat similar to that shown in Figs. 8 and 9, but illustrate a different manner of reinforcing the end sill. The end sill in these figures is designated by the reference character 37 and is reinforced by means of an angular strut 38 riveted to the horizontal flange of the angle end sill 37 and to a diagonal brace 39 of the underframe of the car. The attaching bracket 26a of the member 14 is preferably secured to the horizontal flange 38a of the strut 38. The stress exerted longitudinally of the car during the brake setting operation is transmitted from a relatively small angle end sill 37 to other parts of the car frame. The vertical stresses exerted during said brake setting operation is transmitted to the end sheet 39 of the car end wall.

In Figs. 14 and 15 I have shown the hand brake mechanism applied to a railway car to which the end sill construction is formed by means of spaced angle irons 40, 41, riveted to the lower portion of a sheet metal end wall 42. The attaching bracket 26 of the member 14 is secured preferably to the horizontal flange of the angle bar 41, by means of rivets 43. In order to relieve the angle bar 41 and the lower margin of the end sheet 42 from excessive strains developed during the setting of the hand brake, a compression member, preferably a wooden block 44 is positioned between the angle bars 40 and 41 so as to transmit some of the stresses from the bar 41 to the bar 40. The end sill construction is also preferably further reinforced by means of a vertically disposed channel member 45 riveted to the crest of a plurality of corrugations formed in the end sheet of the car and secured to the lower margin of said sheet and to the angle bars 40, 41 by means of rivets 46. With this construction the vertical stresses are transmitted to the angle bars 40 and 41 and through these bars to the longitudinal sills of the car. The longitudinal stresses are taken up partly by the longitudinal sills of the car and by the channel member 45.

In Figs. 16 and 17, a car construction is illustrated in which there is sufficient distance between the lower end of the channel end sill and the horizontal center line of the pull rod and chain 15 to permit the member 14 to be attached to the lower flange of the end sill. The end sill in this construction is designated by the reference character 47. The member 14 is attached by means of its attaching bracket 26 to the lower flange 48 of the end sill by rivets 49, and is secured also to the horizontal flange 50 of an end sill stiffening member 51. The end sill stiffener is of substantially box shape configuration and is fitted between the horizontal flanges of the end sill 47 and is secured also to a transverse angle bar 52 secured to the inner face of the sheet metal car end wall 53 so as to transmit the compression stresses through the member 51 to the transverse angle 52 and thence through the angle to the end sheet 53 and the under framing of the car.

Figure 19:
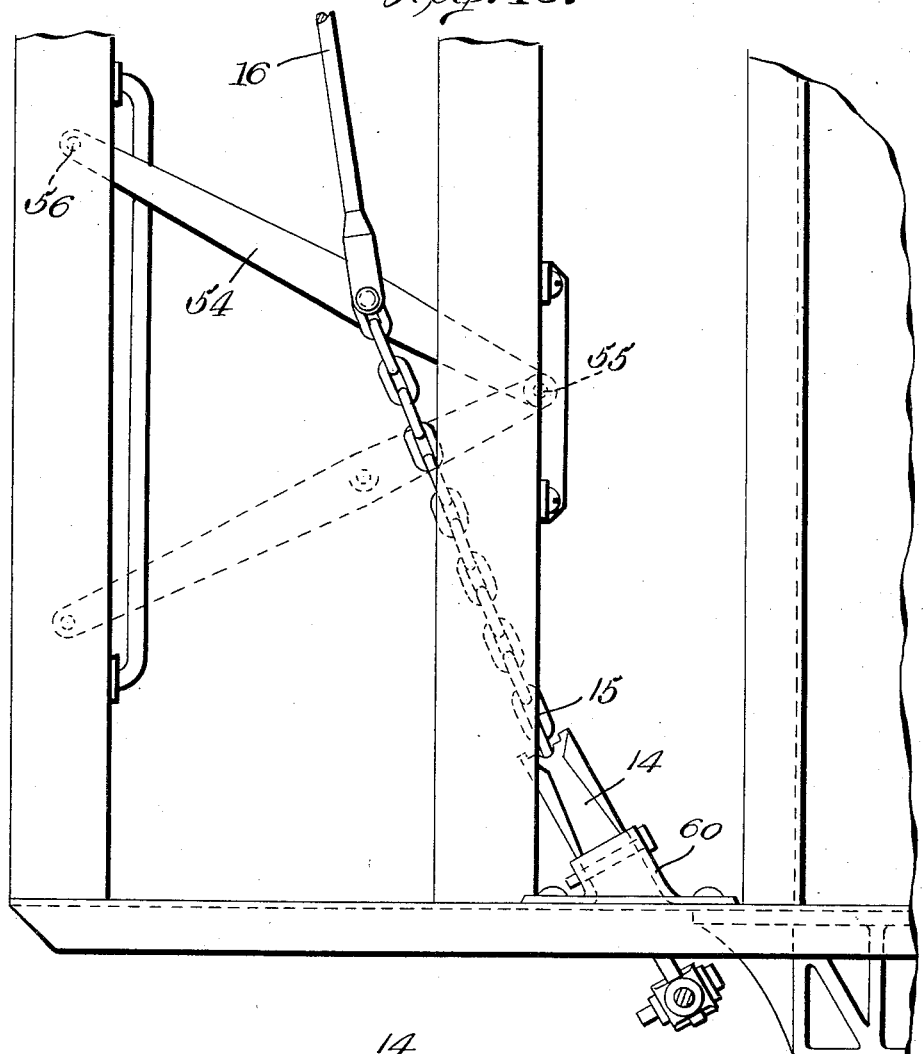
Fig. 19 is a fragmentary plan view of the under frame of a tandem hopper car illustrating application of the hand brake mechanism to this type of car.
Figure 20:
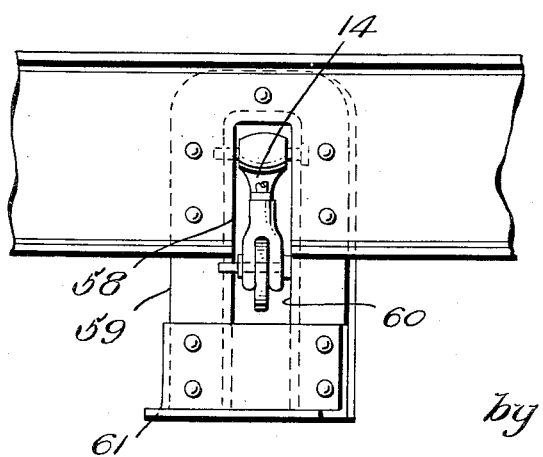
Fig. 20 is a fragmentary elevation of the end sill and reinforcing member shown in Fig. 19.

In Figs. 19 and 20 I have shown the hand brake mechanism applied to a tandem hopper car. In cars of this general character the pull rod 16 of the brake rigging is arranged near one side sill of the under frame. In the embodiment shown in Fig. 19 the pull rod 16 is connected to a lever 54 pivoted at 55 to the under-frame of the car. The chain of the ordinary hand brake is intended to be attached at the end 56 of the lever 54. In applying the brake mechanism shown in Fig. 1 to this type of car, the connector 15 is preferably attached to the lever 54 at the same point of attachment of the pull rod 16. The winding mechanism is arranged preferably a sufficient distance from the side of the car to permit the trainman to stand on the brake platform between the winding mechanism and the corner of the car while operating the brake. In order to obtain this position of the winding mechanism, it is necessary to extend the chain 15 diagonally across the car instead of longitudinally thereof as contemplated in the previous figure. In this construction, the end sill 57 is cut away, as indicated at 58 and the sill is reinforced with a U-shaped reinforcing member 59 formed with a flange secured to the inner face of the end sill 57 and with outwardly projecting flanges 60 between which the power transmitting member 14 is pivoted. The lower ends of the reinforcing member 59 are secured together by means of an angle bar 61. The flanges 60 preferably extend at an angle to the rear face of the end sill so that the center line of the member 14 will be such as to minimize the angular movement of the chain 15 during the winding operation.

The combination of the winding mechanism and bell-crank; the arrangement of the vertical hand wheel and releasing lever; the housing construction; and the bell-crank construction are not claimed herein apart from the reinforcing means herein shown for mounting the said combination and parts thereof on the car. The said combination and improved construction above noted are claimed in the order above mentioned in my copending applications as follows: Serial Numbers 109,061, filed May 14, 1926; 349,817, filed March 25, 1929; 329,243, filed Dec. 29, 1928, and 560,407, filed August 31, 1931.

I claim:

1. The combination with the end sill construction of a railway car a portion of which is provided with a recess, a brake rigging, and hand brake mechanism including winding mechanism adapted to be secured to the car end wall, a power transmitting member adapted to rock through said recess in said end sill, flexible connectors for connecting the power transmitting member to the winding mechanism and to the brake rigging respectively, of means for attaching said power transmitting member to the end sill of the car and for reinforcing said end sill adjacent said power transmitting member.

2. The combination with a railway car end sill construction having a recessed portion, the brake rigging, hand brake mechanism including winding mechanism adapted to be secured to the car end wall, a power transmitting member positioned to project through the recess, flexible connectors for connecting the power transmitting member to the winding mechanism and to the brake rigging respectively, of means for attaching said power transmitting member to the end sill of the car and for reinforcing said end sill adjacent said power transmitting member comprising a bracket having flanges between which the power transmitting member is pivoted and having a reinforcing flange extending around the recessed portion of said end sill.

3. In combination with the brake rigging of a railway car, hand operated power mechanism, a rocking member pivoted under the car in position to exert power in line with the pull rod of said brake rigging; the end sill of the car being formed with a clearance recess to permit outward rocking movement of the power transmitting member, and means for attaching the power transmitting member to the end sill comprising a reinforcing bracket secured to the inner face of said end sill and surrounding said clearance recess.

4. The method of applying hand brake mechanism herein shown to railway cars having end sills, which consists in attaching the winding mechanism at a point on the car end wall at a distance from the side of the car to provide ample standing space for the trainman between said mechanism and the side of the car, arranging the power transmitting member beneath the car at a point to exert power in line with the length of the said pull rod, forming a recess in the end sill construction of the car to permit ample rocking of the power transmitting member, and reinforcing said end sill adjacent said power transmitting member.

5. In combination with the brake rigging of a railway car, hand brake mechanism including hand power winding mechanism secured to the car end wall, a power transmitting member positioned beneath the car, and connectors for connecting the power transmitting member to the brake rigging and to said winding mechanism, of means for securing the power transmitting member to the car end sill and for reinforcing said end sill comprising a vertically disposed stiffening post secured to the end wall of the car and to the end sill structure, an angular bracket secured to the end sill adjacent said vertical post and providing a combined bellcrank support and end sill stiffener.

6. The combination with the brake rigging of a railway car, the car underframing including an end sill of channel configuration in cross section, hand operated power mechanism, a horizontally disposed connector attached to the brake rigging, a rocking member secured to the car and having a winding surface about which said connector is adapted to be wound, and a connector connecting said rocking member to the said hand power mechanism, of means for attaching said rocking member to the car and for reinforcing the car underframing at the end sill comprising an angular stiffener having a side wall, an end wall and upper and lower attaching flanges fitted in the channel portion of said end sill and to the last mentioned attaching flange of which the said rocking member is secured.

RICHARD W. BURNETT.